United States Patent [19]

Hubert et al.

[11] 4,426,052

[45] Jan. 17, 1984

[54] PROCESS AND DEVICE FOR ALIGNING THE ROLL AXIS OF A SATELLITE WITH A DESIRED DIRECTION

[75] Inventors: Bernard Hubert; Bernard Blancke, both of Le Cannet Rocheville, France

[73] Assignee: Societe Nationale Industrielle Aerospatiale, Paris, France

[21] Appl. No.: 400,389

[22] Filed: Jul. 21, 1982

[30] Foreign Application Priority Data

Sep. 28, 1981 [FR] France .................... 81 18245

[51] Int. Cl.³ ............... B64G 1/36; B64G 1/44
[52] U.S. Cl. ............................... 244/168; 244/171; 244/173; 136/246
[58] Field of Search .............. 244/164, 168, 171, 173; 136/245, 246, 292

[56] References Cited

U.S. PATENT DOCUMENTS

| | | | |
|---|---|---|---|
| 3,116,035 | 12/1963 | Cutler | 244/168 |
| 3,304,028 | 2/1967 | Dryden | 244/168 |
| 4,161,780 | 7/1979 | Rudolph et al. | 244/171 |
| 4,262,867 | 4/1981 | Piening | 244/168 |
| 4,288,051 | 9/1981 | Goschel | 244/169 |

Primary Examiner—S. D. Basinger
Assistant Examiner—Rodney A. Corl
Attorney, Agent, or Firm—Merriam, Marshall & Bicknell

[57] ABSTRACT

Device for aligning the roll axis of a rotating artificial satellite having radial solar panels equipped with angularly movable control surfaces at their extremities. The device includes a motor associated with each control surface for controlling the angle of the control surface with respect to the solar panel, each motor being actuated by a current which is dependent on the displacement of the roll axis from a desired position and which varies cyclically during the rotation of the satellite. The motor also includes a detector for detecting the angular speed of movement of the control surface and introducing a damping effect.

7 Claims, 10 Drawing Figures

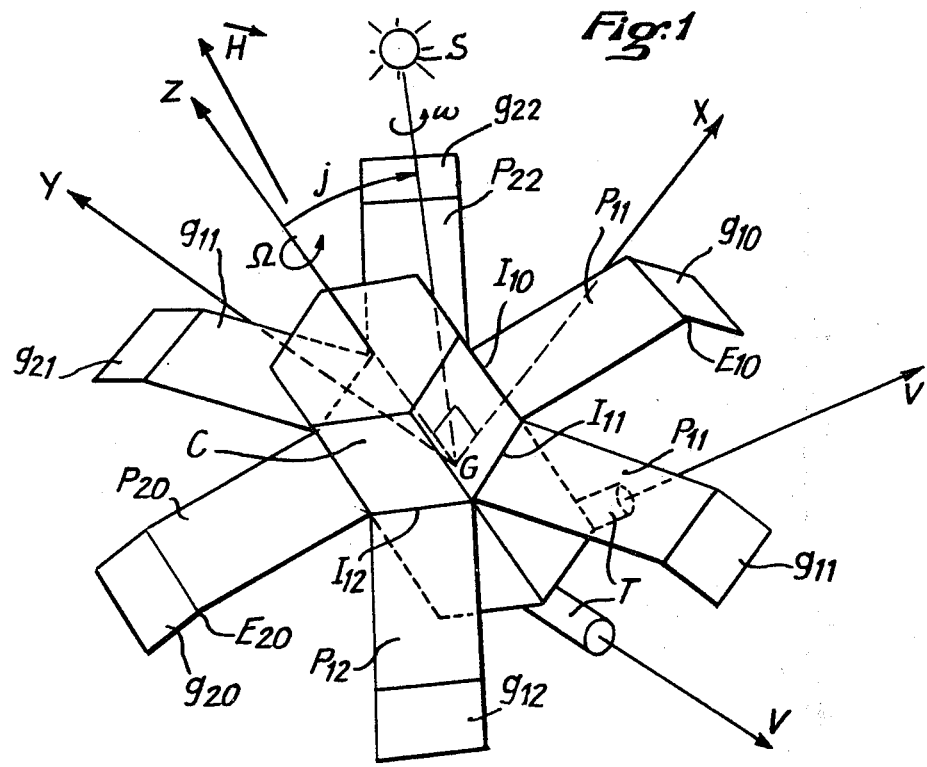

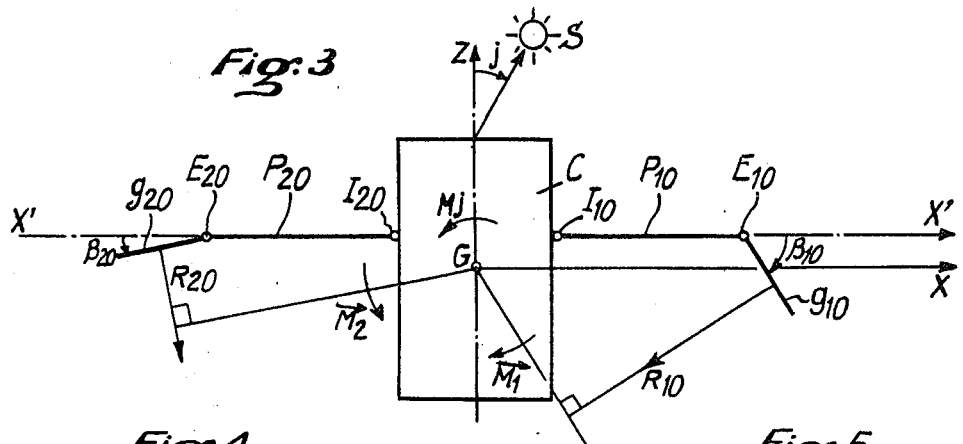
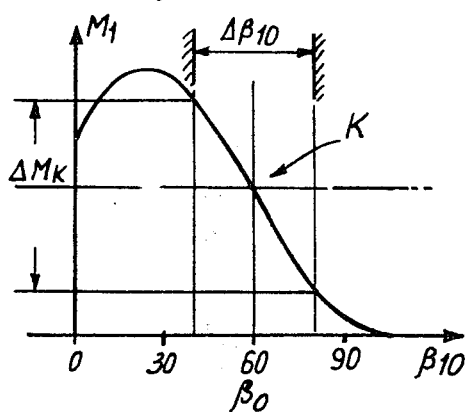
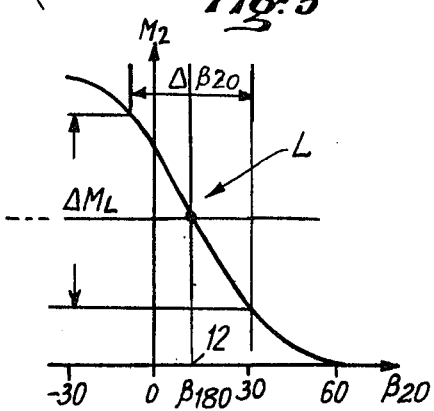
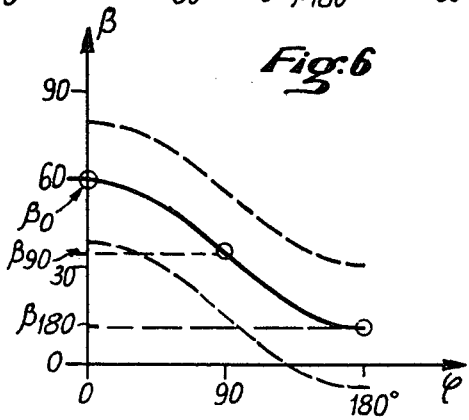
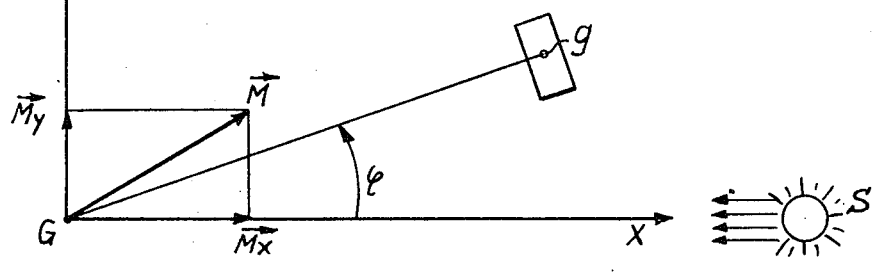

PROCESS AND DEVICE FOR ALIGNING THE ROLL AXIS OF A SATELLITE WITH A DESIRED DIRECTION

The present invention relates to a process for aligning the roll axis of an artificial satellite with any desired direction forming an angle of less than 60 degrees with the direction of the sun, said satellite rotating on itself about its roll axis and this process employing the forces exerted on parts of the satellite by the pressure of solar radiation.

It is more particularly, but not exclusively, applied to satellites for astronomical measurement requiring very stable observation conditions with no disturbing variations.

It is known that, on its orbit, a satellite is subjected to disturbing torques of which the most important causes are:

the dissymmetry of the effets of the pressure of solar radiation, due to the incidence of the axis of the satellite with respect to the sun and to the differences in reflectivity of the elements of the satellite;

the influence of the gradient of the earth's gravity;

the action of the earth's magnetic field on the residual magnetic moment of the satellite;

the aerodynamic influence of the environment (for low orbits).

It is thus indispensable to provide means for controlling the attitude of a satellite on its orbit. Three means to this end are known at the present time.

Two of these means employ a flywheel or gas nozzles, respectively. A flywheel does not produce any disturbances at its bearings, when its suspension is magnetic; however, the electromagnetic switchings of the drive elements of the wheel produce low-amplitude excitations which may be transmitted to the observation means carried by the satellite. Furthermore, the use of gas nozzles producing short attitude-correction pulses from time to time leads to the appearance of excitation transmitted to the structure, the solar panels and the sensitive part of the satellite.

Thus, when it is desired to control the attitude of satellite with minimum disturbance, a third means is used which consists in employing the pressure of solar photon flux radiation and therefore in using orientable surfaces, connected to the satellite and exposed to this pressure.

Numerous particular embodiments of this third means are already known, both passive and active. Mention may be made for example of those described in French Pat. Nos. 1 364 354 and 1 375 558, in the AIAA Journal, July 1963, Vol. 1, No. 7, in the journal J. SPACECRAFT, December 1976, Vol. 13, No. 12, in the journal J. GUIDANCE AND CONTROL, 1980, Vol. 3, No. 2, in Belgian Pat. No. 874 523, in journal ACTA ASTRONAUTICA, 1980, Vol. 7, or in U.S. Pat. Nos. 3,304,028 and 4,262,867.

In U.S. Pat. No. 3,304,028, in order to control the attitude of a satellite stabilised along three of its axes, control surfaces are disposed at the end of solar panels substantially at right angles to the axis of the satellite having to make a determined angle with the direction of the sun, on which control surfaces the solar radiation pressure can act.

The means described and designed in this patent for controlling the control surfaces can be applied only to a satellite stabilized along three axes and are inadequate for stabilizing the attitude of a satellite permanently rotating on itself.

Furthermore, U.S. Pat. No. 3,145,948 describes the means for rotating a satellite, under the action of the solar pressure, with the aid of orientable solar panels, in the manner of a propeller, said satellite being stabilized by other means.

It is an object of the present invention to apply to a satellite rotating on itself the general principle of the correction of attitude by the use of solar pressure. More specifically, this application concerns a satellite having a substantially constant rolling velocity, to enable it to make observations by movement. In this case, it is necessary to control, with respect to solar, stellar or inertial references, the direction of the roll axis which is at least substantially orthogonal to a plane defined by the axes of sight of at least two observation telescopes embarked on the satellite.

To this end, according to the invention, the process for aligning the roll axis of an artificial satellite with any desired direction making an angle less than 60 degrees with the direction of the sun, said satellite rotating on itself about its roll axis and comprising, on the one hand, a plurality of solar panels distributed about said roll axis, which, in extended position of operation, are located in a plane at least approximately orthogonal to said roll axis and on the other hand, mobile surfaces sensitive to the pressure of solar radiation and disposed at the outer end of at least certain of said solar panels, in the manner of control surfaces each articulated about an axis at right angles to the roll axis, is characterised in that the deflection of each control surface with respect to the corresponding solar panel is cyclically controlled during rotation of the satellite about the roll axis.

In order, on the one hand, to maintain the inclination of the roll axis with respect to the direction of the sun at the desired value or to cause it to develop progressively according to a programme, such inclination hereinafter referred to as solar incidence, and, in order, on the other hand, to correct the errors of alignment, due to the causes mentioned hereinabove and detected by appropriate sensors, the control of the inclination of the control surfaces is preferably constituted by three components, of which the first corresponds at least substantially to the balance of the satellite at the desired solar incidence, the second is proportional to the error detected in the plane of the incidence defined by the roll axis and the solar direction and generates a pitching moment normal to this plane, and the third is proportional to the error detected in a plane orthogonal to the plane of the incidence and produces a yaw moment in this latter plane.

Thus, according to the invention, the attitude of the satellite is controlled along two orthogonal planes passing through the roll axis.

Depending on the satellite's missions and/or the progressive weakening of the solar cells, the angle of solar incidence may be varied according to a programme, either by remote-control from earth or by being recorded on board the satellite.

A device for carrying out the process according to the invention advantageously comprises, for controlling each control surface, an electromagnetic motor or actuator whose control current is generated from signals indicating error of position and/or of angular velocity of the satellite, delivered by detectors, with the aid of a pilot chain comprising filtering, control logic and amplifier.

With each motor there may be associated a detector for detecting angular speed of the control surfaces to introduce a damping in the control of the control surface. Each control surface is preferably maintained and articulated on the corresponding solar panel via at least one torsion link. In the preferred embodiment, each control surface is maintained and articulated on the corresponding solar panel via two aligned torsion links, each of said links being anchored at one of its ends on an outer edge of said solar panel and at its other end on the mobile part of the corresponding motor, said motor being disposed in median position on the articulation and its fixed part being fast with said solar panel.

In order to allow satisfactory linearity of control, it may be advantageous if, when an electromagnetic motor is not supplied, the corresponding control surface makes with the solar panel associated therewith an angle of deflection which is not zero. This non-zero angle of deflection may be similar to the angle of deflection taken by the control surfaces when they pass through the plane of solar incidence.

The invention will be more readily understood on reading the following description with reference to the accompanying drawings, in which:

FIG. 1 is a schematic view in perspective of an embodiment of a satellite according to the invention.

FIG. 2 is a schematic plan view of the satellite of FIG. 1.

FIG. 3 is a section along line III—III of FIG. 2.

FIGS. 4 and 5 illustrate, as a function of the angle of deflection given to the control surfaces, the diagram of the moments of solar radiation pressure furnished thereby.

FIG. 6 shows the development of the angle of deflection of a control surface as a function of the position thereof about the roll axis.

FIG. 7 illustrates the control of the deflection of the control surfaces when an error in alignment requires the creation of a corrector moment $\vec{M}$.

Figure 8:
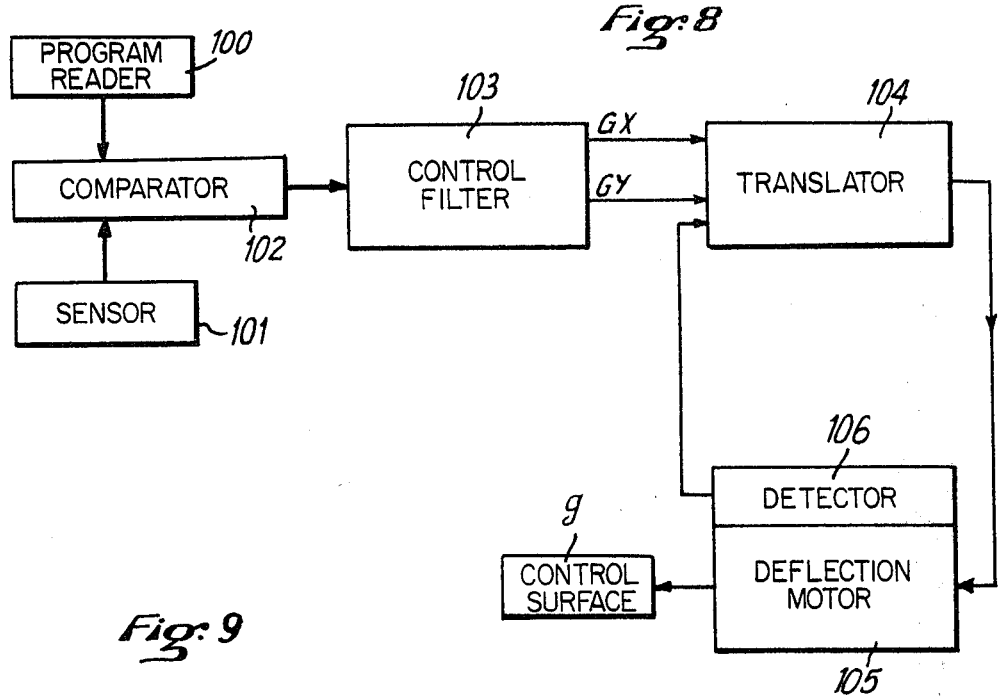
FIG. 8 is a block diagram of a device for controlling the control surfaces.

Referring now to the drawings, the embodiment of a satellite according to the invention for astronomical measurement, shown in FIGS. 1, 2 and 3, essentially comprises:

an elongated prismatic body C, of regular polygonal section, having a longitudinal axis GZ merged with the roll axis;

two stellar observation telescopes T, with axes of sight V, disposed in a plane orthogonal to axis GZ and borne by said body C;

photovoltaic solar panels P10, P11, P12, P20, P21 and P22, which are identical and regularly distributed about axis GZ. Each of these panels is articulated, via a corresponding articulation I10, I11, I12, I20, I21 or I22, on a face of the body C. These articulations are in the same plane at right angles to axis GZ and, in position of operation, the different solar panels are situated in this plane, forming a sort of regular star. During launching and placing on orbit, the panels are folded along the body C.

In the embodiment chosen, six solar panels have been provided, located opposite one another in pairs P10-P20, P11-P21, P12-P22.

As illustrated in FIG. 3, the articulations I10, I11, I12, I21 and I22 are eccentric with respect to the centre of gravity G, with the result that the plane of the extended panels P10, P11, P12, P20, P21 and P22 does not pass through said centre of gravity G.

identical control surfaces g10, g11, g12, g20, g21 and g22, respectively articulated on the end of panels P10, P11, P12, P20, P21 and P22, by means of articulations E10, E11, E12, E20, E21 and E22, equidistant from axis GZ and tangential to the same circle centred on this axis. The centre of gravity of the different control surfaces has been respectively designated by cg10, cg11, cg12, cg20, cg21 and cg22.

The whole of the satellite is positioned with respect to solar radiation at a substantially constant incidence. This incidence is defined by the angle j included between axis GZ and the direction GS of the sun S. An axis GX perpendicular to GZ has been shown in the plane of solar incidence, GZ, GS. Moreover, an axis GY has been shown in FIGS. 1 and 2, perpendicular to axes GZ and GX. A system of coordinates GX, GY, GZ connected at the centre of gravity G of the satellite is thus obtained.

The angle of incidence j may possibly be made to develop slowly, in particular to take into account the degradation of the solar cells of panels P10 to P22.

Stellar exploration by means of telescopes T may be obtained by means of three rotations, with respect to the vault of heaven, namely:

a first rotation of a period of 1 year corresponding to the rotation of the sun around the earth, since the satellite is in orbit around the earth and is oriented towards the sun S with an at least substantially constant incidence j;

a second rotation about axis GS with a velocity $\omega$ corresponding to a period of the order of one month, this rotation corresponding to a precession of axis GZ of the satellite about the direction of the sun; and a third rotation of roll about axis GZ at a speed $\Omega$ corresponding to a period of the order of 2 hours, this rotation ensuring scanning and successively passage of the telescopes T in the direction of the same stars.

The second and the third rotation generate the kinetic moment $\vec{H}$.

It is an object of the present invention to control the angle of solar incidence j and the speed of precession $\omega$ with high precision and with as small variations as possible. In fact, the scanning speed in roll $\Omega$ does not need to be ensured with high precision and may be corrected from time to time in known manner by means of gas nozzles.

To attain this purpose, the invention employs solar pressure corrector torques about axes GS and GY, these torques resulting from the superposition of controls given to control surfaces g10 to g22. The first of these controls corresponds to the obtaining of a balanced incidence j of the satellite with respect to the sun, in the absence of outside disturbances. The principle of this first control is explained with reference to FIGS. 3 to 6.

FIGS. 2 and 3 show the satellite at the moment when the centre of gravity cg10 of the control surface g10 passed in plane GZ, GX. Moreover, FIG. 2 shows the angle $\phi$ making it possible to mark the position of the centres of gravity cg10 to cg22 about axis GZ, with respect to axis X'—X' which is, in the plane of extended panels P10 to P22, the projection of axis GX. This angle $\phi$ is such that its drift $d\phi/dt$ with respect to time t is equal to $\Omega$.

As shown clearly in FIG. 2 and especially in FIG. 3, the control surfaces g10 to g22 are given respective deflections $\beta_{10}$ to $\beta_{22}$, all in the same direction, towards the centre of gravity G.

FIG. 3 shows that the deflections $\beta_{10}$ and $\beta_{20}$ of control surfaces g10 and g20 respectively produce, in combination with the incidence j, forces of solar pressure R10 and R20 which induce moments $\vec{M}_1$ and $\vec{M}_2$ of opposite signs, with respect to axis GY.

Each of the other couples g11-g21 and g12-g22 of control surfaces also generates moments such as moments $\vec{M}_1$ and $\vec{M}_2$, the value of these moments depending on the incidence j and on the angular position $\phi$ about axis GZ.

For a given incidence j (for example equal to 36°), FIGS. 4 and 5 respectively show the curves (K) and (L) of variation of the moments $\vec{M}_1$ and $\vec{M}_2$ for control surface g10 and for control surface g20, respectively as a function of the angles of deflection $\beta_{10}$ and $\beta_{20}$. In this way, the curve (K) represents the variation of the moment of solar radiation pressure generated by a control surface g10 to g22 for an angle $\phi=0$, whilst curve (L) illustrates the variation of the moment of solar radiation pressure generated by one of these control surfaces for $\phi=180°$.

These curves (K) and (L) show that it is possible to find, for each of control surfaces g10 and g20, a range $\Delta M_K$ or $\Delta M_L$, in which the amplitude of moment $\vec{M}_1$ or $\vec{M}_2$ varies substantially linearly for a variation $\Delta \beta_{10}$ or $\Delta \beta_{20}$ of the angle of deflection $\beta_{10}$ or $\beta_{20}$.

If it is assumed that the moment $\vec{M}_j$ of the forces of solar radiation pressure exerted on the body C of the satellite and on the panels P10 to P22 is constantly zero about the angle of balance, it is seen from FIGS. 4 and 5 that it is possible to find, in the middle of each range $\Delta M_K$ and $\Delta M_L$, values of angle of deflection $\beta_0$ or $\beta_{180}$ respectively, for which the moments $\vec{M}_1$ and $\vec{M}_2$ are of the same magnitude. As these moments are of opposite signs, their effects are cancelled.

Thus, with the preceding hypotheses, the condition of balance in the plane of incidence is that the angles of deflection $\beta_{10}$ and $\beta_{20}$ are respectively equal to $\beta_0$ and $\beta_{180}$. In the example shown, these values are respectively equal to 60° and to 12° and, around these values, the range of linearity is of the order of ±15° and even ±20° with about 5% distorsion.

Moreover, it may be seen that a decrease in the incidence j acts as an increase of $\beta 10$ and a decrease $\beta 20$, i.e. brings about a decrease in the moment $\vec{M}_1$ and an increase of the moment $\vec{M}_2$: the resultant moment therefore tends to increase the incidence. Similarly, an increase in incidence would be seen to have the opposite effect. The system is therefore statically stable.

Furthermore, an increase of $\beta_{10}$ and a decrease of $\beta_{20}$ at constant incidence produce a moment of the same sign.

A study similar to the preceding one, made in the plane GZ, GY orthogonal to the plane of incidence, shows that, to obtain balance, it is necessary to give to the control surface passing to $\phi=90°$ an angle of deflection equal to a value $\beta_{90}$ and to the control surface passing through $\phi=270°$, an angle of deflection equal to a value $\beta_{270}$ with $\beta_{90}=\beta_{270}$. In the example chosen above, $\beta_{90}=\beta_{270}=36°$. This value is substantially independent of j.

Thus, to obtain static balance of the satellite, the angle of deflection of each of the control surfaces as a function of its angular position about axis GZ as the satellite rotates about this axis must be varied in sinusoidal manner, so that:

| for | $\phi = 0°$ | $\beta = \beta_0$ |
|---|---|---|
|  | $\phi = 90°$ | $\beta = \beta_{90}$ |
|  | $\phi = 180°$ | $\beta = \beta_{180}$ |
|  | $\phi = 270°$ | $\beta = \beta_{90}$ |
|  | $\phi = 360°$ | $\beta = \beta_0$ |

The moment of the forces of solar radiation pressure exerted on the body C of the satellite is disturbing, but it is minimized by the shape of revolution of the satellite. The resultant moment $\vec{M}_j$ may vary as a function of the incidence j: its extreme values must be substantially less that those which the control surfaces can furnish so that the latter may further furnish moments of correction.

Account is taken of this criterion when dimensioning the control surfaces.

FIG. 6 illustrates the variation of the angle of deflection of each of the control surfaces g10 to g22 as a function of the angular position $\phi$ of its centre of gravity.

Figure 9:
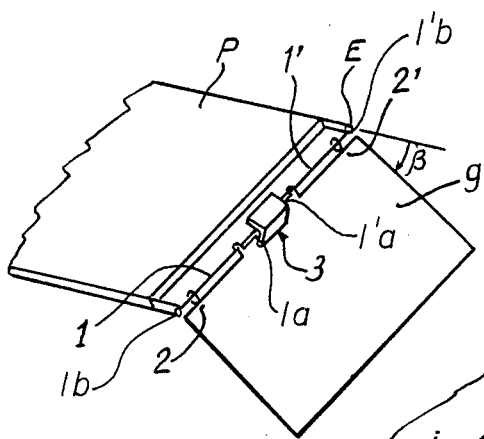
FIG. 9 illustrates the articulation and control of a control surface.
Figure 10:
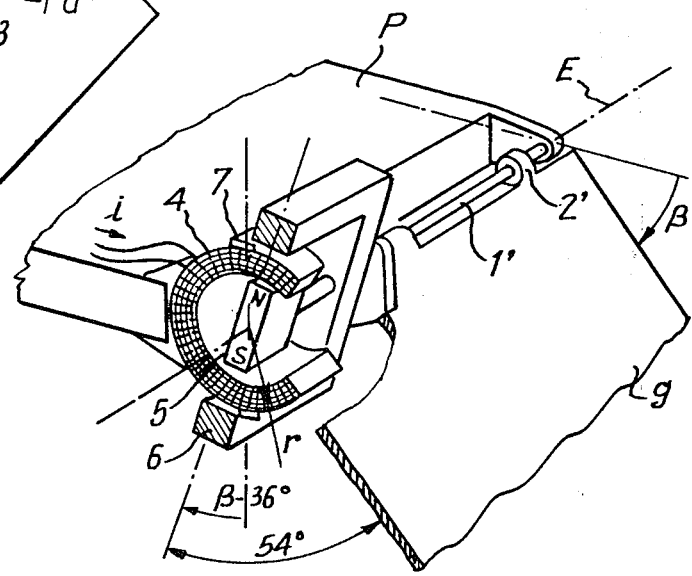
FIG. 10 shows, on a larger scale and partially in section, the motor of a control surface.

It may be advantageous, to obtain a better linearity of control, if the control surfaces, when their actuators are at rest (one example of which is illustrated in FIGS. 9 and 10), present a rest deflection $\beta_r$ which is not equal to 0. For example, $\beta_r$ is advantageously selected to be at least approximately equal to $\beta_{90}$. In this way, the controls of balance are made by a controlled deflection of amplitude $\pm \Delta\beta$, with $\Delta\beta=\beta_0-\beta_{90}=\beta_{90}-\beta_{180}$. To this variation $\Delta\beta$ is added a range of ±20° corresponding to the linear part of the characteristics (K), (L), etc. A control amplitude of $\pm(\Delta\beta+20°)$ may therefore be obtained around $\beta_{90}$. In FIG. 6, the corresponding control zone is defined by dashed lines.

Due to such an initial adjustment ($\beta_r=\beta_{90}$), it is possible to work the invention up to values of the solar incidence j close to 60°.

Whilst the satellite is rotating about its axis GZ, its attitude is measured.

The measured attitude is deduced from the position detected by star sensors incorporated in the two telescopes T of the satellite. When a telescope T is situated in the plane of solar incidence GX, GZ, it enables the attitude in incidence to be measured. When a telescope is situated in a plane perpendicular to plane GX, GZ, it enables the attitude of lateral depointing to be measured. When a telescope aims at a star situated between the two preceding planes, the sensor detects an error which may be found in any direction. The two components of this error, in the directions GX and GY, are obtained by means of a resolver which employs the orientation in roll of the satellite in the distribution of the information. It generally suffices to memorize the coordinates of about one star per minute of time (or about 3° of angle on the celestial sphere) to allow a very progressive resetting of the satellite.

The error of attitude results from the comparison of the attitude measured with the nominal attitude (which corresponds to the programme of celestial exploration), with the possible aid of an integration of the angular velocity, itself measured by means of a gyrometer, which integration may be periodically rest. This latter means may enable a D.C. signal to be obtained between two observations of stars. This signal may also be obtained by filtering the errors detected. This processing of the errors enables the correction device to be furnished with sufficiently continuous information to avoid being at the origin of parasitic variations.

Processing is effected separately on the two components of the error.

If at a given instant an error in alignment is detected, it necessitates the creation of a moment $\vec{M}$ situated in the plane GX, GY (cf. FIG. 7). As shown, this moment may be decomposed in directions GX and GY into $\vec{MX}$ and $\vec{MY}$.

To create a moment $\vec{MY}$, the most efficient control surfaces are those corresponding at that instant to $\phi=0$ and $\phi=180$, whilst those corresponding to $\phi=90$ and $\phi=270$ have no efficient moment along axis GY. Moreover, it has been seen hereinabove that, to create a moment, two control surfaces offset by 180° must have opposite deflections with respect to the balancing deflections.

It follows that, to create the moment MY, it will be expedient to give each control surface g as a function of its position an additional deflection of the form:

$$\delta\beta_1 = \beta_1 \cdot \cos \phi.$$

Similarly, to create a moment $\vec{MX}$, an additional deflection will be given:

$$\delta\beta_2 = \beta_2 \cdot \sin \phi.$$

The values of deflection $\beta_1$ and $\beta_2$, respectively relative to the corrections along axes GX and GY, are linear functions of the errors detected or, which comes to the same thing, of the required moments:

$$\beta_1 = \frac{1}{K1} |MY| \text{ and } \beta_2 = \frac{1}{K2} |MX|$$

with, for example: $1/K1 = -2.4 \cdot 10^4$ rad/Nm, and $1/K2 = +2.9 \cdot 10^4$ rad/Nm.

Calculation shows, on the one hand, that the couplings between the corrections made along GX and GY are weak (<10% for deflection of 20°) and, on the other hand, that the ranges of linearity of the control surfaces are large (±5% for 20° deflection).

With control surfaces of 1 m×0.5 m and a reflectivity close to 1, the moment capacity is for example $10^{-5}$ Nm for 20° deflection, or several times the capacity required for manoeuvring the satellite, including the balancing of the disturbing torques.

FIG. 8 shows the block diagram of the device for controlling the control surface g.

The desired nominal attitude corresponds to the celestial observation programme. This programme is drawn up so that the movement of the satellite is perfectly continuous. The nominal attitude is defined from coordinates of the reference stars with respect to the sight and is delivered by a programme reader 100.

Furthermore, sensors 101 (associated with telescopes T as has been seen above) furnish the measured attitude of the satellite. This measured attitude is compared with the nominal attitude in a comparator 102.

After processing, the error signals coming from the comparator 102 are transmitted to a control filter 103 of the P.I.D. type, which makes it possible to integrate the result of the earlier corrections and to calculate the phase advance terms necessary for damping the movement underway. In this way, control is progressive and continuous, allowing progressive variations even during an acquisition or after an eclipse.

The outputs of the filter, relative to each of the axes GX and GY, represent control torques, which take into account the dampings calculated as a function of the speed of correction of the errors and the variations remaining to be corrected.

These control torques are then converted, in a translator 104 representing the laws of deflection and associating the distribution as a function of the direction $\phi$, into deflection controls for each of the control surfaces.

These deflection controls are addressed to the deflection motors 105 of the control surfaces g. Detectors 106 for detecting the angular velocity of the corresponding control surface are associated with these motors. This information may modify the law of deflection ordered by the translator 104 for said control surface.

The deflections obtained produce, under the effect of solar radiation, driving moments which act on the satellite.

Under the combined effect of the driving moments, the moments due to the solar pressure, the disturbing moments, a dynamic response of the satellite is obtained as a function of its inertias.

Finally, the response of the satellite is translated by a real attitude, which is at the origin of the attitude measured by means of sensors 101.

FIGS. 9 and 10 show an example of articulation of a control surface g on the end of a panel P, about axis E.

This axis E is materialized by two aligned, stretched torsion cables 1 and 1'. Each of these cables is anchored, on the one hand, at a point 1a or 1'a close to the centre of the inner edge of the control surface, on either side of the motor 3 (corresponding to a motor 105 of FIG. 8), and on the other hand at a point 1b or 1'b close to the end edge of the panel P. Bearings 2 and 2' fast with the control surfaces g are provided, through which the torsion cables 1 and 1' pass with clearance. In operational configuration, there is no contact with the bearings, this eliminating friction and avoiding the problems of diffusion in vacuo.

The control surfaces g are controlled by a motor 3 disposed in median position on the line of articulation E. This motor 3 is preferably of the electromagnetic type without switching, with single driving coil. FIG. 10 shows said motor in detail. It comprises a coil 4, fast with the solar panel P, which directly receives a control current i, without rotating contacts, nor supple wires liable to break. The mobile part, fast with the control surface g, comprises, at the centre of the coil, a permanent magnet 5 and, outside the air gaps, a soft iron magnetic circuit 6.

As the cables 1 and 1' for maintaining the control surface have a torsion stiffness $\lambda$, it is seen that, in the absence of any other action, the angle of deflection of the control surface is proportional to the current i passing in the coil 4 as the torsion T is equal to:

$$\vec{T} = \lambda \vec{\beta'} = K' \vec{B}_A n \, \vec{i} \, l \, r, \text{ with}$$

$$\beta' = \beta - \beta_r$$

K': coefficient of efficiency of the turns
B: magnetic field in the air gap
n: number of turns of the coil
i: intensity of the control current l: width of the magnet r: mean radius of action of the coil.

For this equation to give the position of the control surface correctly, the moment due to the force of solar pressure about the hinge must be much less than the torque of the cables maintaining the control surface.

It should be noted that the turns which constitute the coil 4 are arranged in cylindrical form so that the torque produced by a given current is substantially constant, whatever the value of the angle of deflection. However, there is a technological limit and it is difficult to envisage a deflection greater than ±60° with respect to the mean value. This confirms the necessity of proceeding with an initial setting $\beta_r$ of the control surface with respect to the motor, which, furthermore, requires less electrical current.

Each motor 3 may be equipped with a device for measuring the angular speed of deflection. This measurement is effected by means of the field variation produced in a fixed coil 7 (corresponding to a detector 106 in FIG. 8) by the movement of the permanent magnet of the motor, which induces a current proportional to the variation of the field.

The coil 7 intended for this measurement is located outside the control coil of the motor and in the plane of the magnet when i=0.

This arrangement is rendered possible by the fact that the control coil being substantially cylindrical, it produces virtually no field in the zone of measurement.

If need be, the velocity detector may be dissociated from the motor and form part of an independent magnetic circuit; it may be based on the same principle of a fixed coil and of a mobile magnet.

What is claimed is:

1. A device for controlling the roll axis of a rotating artificial satellite relative to the sun within an angle of 60°, said satellite having a plurality of radial solar panels, at least some of which are provided at their outer extremities with angularly movable control surfaces responsive to solar pressure, said device comprising:

an electromagnetic motor associated with each of said control surfaces for controlling its angular position relative to its associated solar panel;

means including detecting, filtering, control logic, and amplifying means for generating and supplying to said motors cyclic actuating currents dependent on errors of position or angular velocity of said satellite, whereby each said motor causes its associated control surface to vary its angular position during rotation of said satellite in a direction to reduce said errors; and detecting means associated with each motor for detecting the angular speed of the associated control surface and introducing a damping in the control of said surface.

2. The device of claim 1, wherein each control surface is maintained and articulated on the corresponding solar panel by connecting means including at least one torsion link.

3. The device of claim 2 wherein said connecting means comprises two aligned torsion links, each of said links being anchored at one of its ends on an outer edge of said solar panel and at its other end on a mobile part of the corresponding motor, said motor being disposed in median position on the articulation and having a fixed part fast with said solar panel and said links, avoiding any contact between said fixed part and said mobile part.

4. The device of claim 2, wherein each motor is of the type with fixed inductor coil and with rotating permanent magnet.

5. The device of claim 1, wherein, when an electromagnetic motor is not actuated, the corresponding control surface makes with the solar panel associated therewith an angle of deflection which is not zero.

6. The device of claim 5, wherein said non-zero angle of deflection approximates the angle of deflection taken by a control surface when it passes through the plane of solar incidence.

7. The device of claim 1 wherein the currents generated by said control means incorporate three components, of which the first corresponds substantially to the desired attitude of the satellite, the second is proportional to an error detected in a plane of incidence defined by the roll axis and the solar direction and generates a pitching moment normal to said plane of incidence, and the third is proportional to an error detected in a plane orthogonal to said plane of incidence and produces a yaw moment in said orthogonal plane.

* * * * *